United States Patent
Chen et al.

(10) Patent No.: US 12,200,665 B2
(45) Date of Patent: Jan. 14, 2025

(54) METHOD OF SIDELINK SYSTEM INFORMATION TRANSMISSION AND DEVICE THEREOF

(71) Applicant: ZTE CORPORATION, Guangdong (CN)

(72) Inventors: Lin Chen, Shenzhen (CN); Wei Luo, Shenzhen (CN); Mengzhen Wang, Shenzhen (CN); Boyuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 524 days.

(21) Appl. No.: 17/670,834

(22) Filed: Feb. 14, 2022

(65) Prior Publication Data
US 2022/0272667 A1  Aug. 25, 2022

Related U.S. Application Data

(63) Continuation of application No. PCT/CN2019/100789, filed on Aug. 15, 2019.

(51) Int. Cl.
*H04W 72/02* (2009.01)
*H04W 72/30* (2023.01)
*H04W 76/20* (2018.01)
*H04W 36/00* (2009.01)

(52) U.S. Cl.
CPC ........... *H04W 72/02* (2013.01); *H04W 72/30* (2023.01); *H04W 76/20* (2018.02); *H04W 36/037* (2023.05)

(58) Field of Classification Search
CPC ..... H04W 72/02; H04W 72/30; H04W 76/20; H04W 36/037
See application file for complete search history.

(56) References Cited

U.S. PATENT DOCUMENTS

| | | | |
|---|---|---|---|
| 2018/0092065 A1 | 3/2018 | Sheng | |
| 2018/0115430 A1 | 4/2018 | Seo | |
| 2018/0227851 A1 | 8/2018 | Kubota et al. | |
| 2021/0068156 A1* | 3/2021 | Suzuki | H04W 48/14 |

FOREIGN PATENT DOCUMENTS

| | | |
|---|---|---|
| CN | 108353422 A | 7/2018 |
| CN | 109155985 A | 1/2019 |
| CN | 110115080 A | 8/2019 |
| EP | 3 413 632 | 12/2018 |

OTHER PUBLICATIONS

Extended European Search Report—EP 19941158.8, mailed Jun. 7, 2022 (10 pgs).
Examination Report for IN Appl. No. 202227006918, dated Jan. 16, 2024 (6 pages).
International Search Report and Written Opinion for PCT Appl. No. PCT/CN2019/100789, mailed Apr. 26, 2020 (8 pages).
Qualcomm Incorporated, "Enhancements of LTE Uu and NR Uu to control NR sidelink" 3GPP TSG-RAN WG2 Meeting #103bis, R2-1814954, Oct. 12, 2018, Chengdu, China (4 pages).
Samsung, "RRC Connection Initiation Trigger for V2X Sidelink Communication" 3GPP TSG-RAN2 106, R2-1905727, May 17, 2019, Reno, USA (3 pages).

* cited by examiner

*Primary Examiner* — Kent Krueger
(74) *Attorney, Agent, or Firm* — Foley & Lardner LLP

(57) ABSTRACT

Method, systems and devices for sidelink system information transmissions. The method comprises receiving, from a base station, periodically broadcast system information comprising sidelink indication information and receiving, from the base station, sidelink transmission resource configuration information.

12 Claims, 4 Drawing Sheets

METHOD OF SIDELINK SYSTEM INFORMATION TRANSMISSION AND DEVICE THEREOF

CROSS-REFERENCE TO RELATED APPLICATION

This application claims the benefit of priority under 35 U.S.C. § 120 as a continuation of PCT Patent Application No. PCT/CN2019/100789, filed on Aug. 15, 2019, the disclosure of which is incorporated herein by reference in its entirety.

TECHNICAL FIELD

This document is directed generally to system information transmissions and resource pool configurations of new radio (NR) sidelink communications.

BACKGROUND

With the increase in the number of vehicles, people pay more and more attention on how to reduce traffic accidents, how to rescue timely, how to coordinate on-site traffic, etc. With the development of communication technology and electronic technology, more and more vehicles are equipped with vehicle communication modules. Through such vehicle equipment, a variety of information exchanges, such as exchanging of accident pre-warning information, traffic status reminder information and so on, become plausible. In addition to Vehicle-to-Everything (V2X) services for basic safety, more and more advanced V2X services are specified. For example, the advanced V2X services may be divided into four categories: vehicle platooning, extended sensors, semi-automated or full-automated driving, and remote driving. These advanced V2X services have a wide variety of performance requirements, e.g. data packet size between 50 to 12000 bytes, data rate between 0.5-1000 Mbps, maximum end-to-end latency between 3-500 ms, reliability between 90%-99.999% and transmission range between 50-1000 meters.

Generally speaking, vehicle communication can be divided into three types: Vehicle-to-Vehicle Communications (V2V), Vehicle-to-Pedestrian Communications (V2P), Vehicle-to-Infrastructure/Network Communications (V2I/V2N). In $3^{rd}$ generation partner project (3GPP), sidelink based V2X communication is one of the main research issue. That is, the V2X data packet is transmitted from the source UE to the target UE directly via radio interfaces as shown in FIG. 3. In FIG. 3, the UEs UE1, UE2 and UE3 may be the network devices capable of performing wireless communications. For example, the UEs UE1, UE2 and UE3 may be a vehicle, another vehicle and a mobile phone, respectively. As shown in FIG. 1, communications between the UEs is not necessary to go through the base station or core network (e.g. evolved universal terrestrial radio access network (E-UTRAN) or next generation radio access network (NG-RAN)). These type of communication is known as PC5-based V2X communications or V2X sidelink communications.

In addition to the V2X communications, there are many other forms of device to device communication scenario, such as a public safety scenario, a UE-to-UE direct communication for social networking, etc, which can also be called as sidelink communications.

SUMMARY

This document relates to methods, systems, and devices for system information transmissions and resource pool configurations of new radio (NR) sidelink communications.

The present disclosure relates to a wireless communication method for use in a user equipment. The wireless communication method comprises receiving, from a base station, periodically broadcast system information comprising sidelink indication information, and receiving, from the base station, sidelink transmission resource configuration information.

Various embodiments may preferably implement the following features:

Preferably, the sidelink indication information indicates whether the user equipment is allowed to perform sidelink transmissions.

Preferably, the sidelink indication information indicates whether the user equipment is allowed to perform sidelink transmissions.

Preferably, the step of acquiring, from the base station, the sidelink resource configuration information comprises transmitting, to the base station a system information request message, and receiving, from the base station, the sidelink transmission resource configuration information from on-demand system information.

Preferably, the step of acquiring, from the base station, the sidelink transmission resource configuration information comprises establishing a connection with the base station and receiving, from the base station, the sidelink transmission resource configuration information when determining the periodically broadcast system information does not have sidelink transmission resource configuration information.

Preferably, the wireless communication method further comprises performing sidelink transmissions based on the sidelink transmission resource configuration information.

Preferably, the sidelink indication information comprises at least one of an indication of whether sidelink transmissions are enabled for RRC_IDLE/INACTIVE UE, an indication of whether a sidelink transmission resource pool is provided in on-demand system information, an indication of whether sidelink radio bearer configuration is provided in the on-demand system information, a sidelink transmission resource pool or a sidelink exceptional transmission resource pool.

Preferably, a radio resource control state of the user equipment is one of an idle state and an inactive state.

The present disclosure relates to a wireless communication method for use in a base station. The wireless communication method comprises periodically broadcasting system information comprising sidelink indication information, and transmitting, to a user equipment, sidelink transmission resource configuration information.

Various embodiments may preferably implement the following features:

Preferably, the sidelink indication information indicates whether the user equipment is allowed to perform sidelink transmissions.

Preferably, the step of transmitting, to the user equipment, the sidelink transmission resource configuration information comprises transmitting, to the user equipment, the sidelink transmission resource configuration information in on-demand system information.

Preferably, the step of transmitting, to the user equipment, the sidelink transmission resource configuration information comprises establishing a connection with the user equipment and transmitting, to the user equipment, the sidelink transmission resource configuration information when the periodically broadcast system information does not have sidelink transmission resource configuration information.

Preferably, the sidelink indication information comprises at least one of an indication of whether sidelink transmissions are enabled for RRC_IDLE/INACTIVE UE, an indication of whether a sidelink transmission resource pool is provided in on-demand system information, an indication of whether sidelink radio bearer configuration is provided in on-demand system information, a sidelink transmission resource pool or a sidelink exceptional transmission resource pool.

Preferably, a radio resource control state of the user equipment is one of an idle state and an inactive state.

The present disclosure relates to a wireless communication method for use in a user equipment. The wireless communication method comprises transmitting, to a base station, an indication for indicating an interest of performing sidelink communications.

Various embodiments may preferably implement the following features:

Preferably, the wireless communication method further comprises receiving, from the base station, sidelink relevant system information.

Preferably, the sidelink relevant system information is configured for performing the sidelink communications.

Preferably, the sidelink communications are at least one of sidelink transmissions or sidelink receptions.

Preferably, a radio resource control state of the user equipment is a connected state.

The present disclosure relates to a wireless communication method for use in a base station. The wireless communication method comprises receiving, from a user equipment, an indication for indicating an interest of performing sidelink communications.

Various embodiments may preferably implement the following features:

Preferably, the wireless communication method further comprises transmitting, to the user equipment, sidelink relevant system information.

Preferably, the sidelink relevant system information is configured for performing the sidelink communications.

Preferably, the sidelink communications are at least one of sidelink transmissions or sidelink receptions.

Preferably, a radio resource control state of the user equipment is a connected state.

The present disclosure relates to a wireless communication method for use in a user equipment. The wireless communication method comprises receiving, from a base station, exceptional resource pool information of a plurality of exceptional resource pools configured for a plurality of cast types.

Various embodiments may preferably implement the following feature:

Preferably, the plurality of cast types comprises at least one of broadcast, groupcast or unicast.

The present disclosure relates to a wireless communication method for use in a base station. The wireless communication method comprises transmitting, to a user equipment, exceptional resource pool information of a plurality of exceptional resource pools configured for a plurality of cast types.

Various embodiments may preferably implement the following feature:

Preferably, the plurality of cast types comprises at least one of broadcast, groupcast or unicast.

The present disclosure relates to a wireless communication method for use in a user equipment. The wireless communication method comprises receiving, from a base station, exceptional resource pool information of a plurality of exceptional resource pools, wherein at least one of the plurality of exceptional resource pools is configured without feedback resources and/or at least one of the plurality of exceptional resource pools is configured with the feedback resources.

The present disclosure relates to a wireless communication method for use in a base station. The wireless communication method comprises transmitting, to a user equipment, exceptional resource pool information of a plurality of exceptional resource pools, wherein at least one of the plurality of exceptional resource pools is configured without feedback resources and/or at least one of the plurality of exceptional resource pools is configured with the feedback resources.

The present disclosure relates to a wireless communication method for use in a user equipment. The wireless communication method comprises performing sidelink transmissions based on a sidelink configured grant when determining a physical layer failure, wherein the sidelink configured grant is one of a configured grant type 1 or a configured grant type 2.

Various embodiments may preferably implement the following features:

Preferably, the sidelink configured grant is the configured grant type 1 and the step of performing the sidelink transmissions based on the sidelink configured grant when determining the physical layer failure comprises utilizing the sidelink configured grant to perform the sidelink transmissions on logic channels being allowed to use the sidelink configured grant when determining the physical layer failure.

Preferably, the sidelink configured grant is the configured grant type 1 and the step of performing the sidelink transmissions based on the sidelink configured grant when determining the physical layer failure comprises utilizing an exceptional resource pool to perform the sidelink transmissions on logic channels other than logic channels not being allowed to use the sidelink configured grant when determining the physical layer failure.

Preferably, the sidelink configured grant is the configured grant type 1 and the step of performing the sidelink transmissions based on the sidelink configured grant when determining the physical layer failure comprises utilizing sidelink configured grant to perform the sidelink transmissions on all of logic channels when determining the physical layer failure.

Preferably, the sidelink configured grant is the configured grant type 2 and the step of performing the sidelink transmissions based on the sidelink configured grant when determining the physical layer failure comprises utilizing the sidelink configured grant to perform the sidelink transmissions when determining the physical layer failure.

Preferably, the wireless communication method further comprises initiating a radio resource control re-establishment procedure, and utilizing an exceptional resource pool of a re-established cell to perform the sidelink transmissions.

Preferably, the wireless communication method further comprises utilizing the exceptional resource pool to perform the sidelink transmissions before receiving a sidelink resource configuration from the re-established cell after the radio resource control re-establishment is successful.

The present disclosure relates to a wireless communication method for use in a user equipment. The wireless communication method comprises utilizing at least one of a configured grant type 1 or an exceptional resource pool to perform sidelink transmissions when receiving a handover command including the configured grant type 1.

Various embodiments may preferably implement the following features:

Preferably, the step of utilizing at least one of the configured grant type 1 or the exceptional resource pool to perform the sidelink transmissions when receiving the handover command including the configured grant type 1 comprises utilizing the configured grant type 1 to perform the sidelink transmissions on logic channels being allowed to use the configured grant type 1 when receiving the handover command.

Preferably, the step of utilizing at least one of the configured grant type for the exceptional resource pool to perform the sidelink transmissions when receiving the handover command including the configured grant type 1 comprises utilizing the exceptional resource pool to perform the sidelink transmissions on logic channels not being allowed to use the configured grant type 1 when receiving the handover command.

Preferably the step of utilizing at least one of the configured grant type for the exceptional resource pool to perform the sidelink transmissions when receiving the handover command including the configured grant type 1 comprises utilizing the configured grant type 1 to perform the sidelink transmissions on all of logic channels when receiving the handover command.

The present disclosure relates to a wireless communication method for a user equipment operating in a dual-connectivity mode with a master node and a secondary node. The wireless communication method comprises receiving, from the master node, sidelink transmission resource configuration information for a plurality of radio access technologies, RATs.

Various embodiments may preferably implement the following features:

Preferably, the wireless communication method further comprises receiving, from the master node, an exceptional resource pool of at least one secondary cell of the master node.

Preferably, the plurality of radio access technologies comprises a new radio RAT and a long-term evolution RAT.

Preferably, the master node and the secondary node operate in different RATs.

The present disclosure relates to a wireless communication method for use in a base station. The wireless communication method comprises transmitting, to a user equipment, sidelink transmission resource configuration information for a plurality of radio access technologies, RATs.

Various embodiments may preferably implement the following features:

Preferably, the wireless communication method further comprises transmitting, to the user equipment, an exceptional resource pool of at least one secondary cell of the base station.

Preferably, the plurality of radio access technologies comprises a new radio RAT and a long-term evolution RAT.

The present disclosure relates to a wireless communication method for used in a user equipment connected to a first network node of a first radio access technology, RAT, controlled by a second network node of a second RAT. the wireless communication method comprises receiving, from the first network node, a sidelink transmission resource configuration of the second RAT with an exceptional resource pool of the first RAT.

Various embodiments may preferably implement the following feature:

Preferably, the first RAT is one of new radio RAT and long-term evolution RAT and the second RAT is another one of the new radio RAT and the long-term evolution RAT.

The present disclosure relates to a wireless communication method for a base station which operates in a first radio access technology, RAT, and is controlled by a network node of a second RAT. The wireless communication method comprises transmitting, to a user equipment, a sidelink transmission resource configuration of the second RAT with an exceptional resource pool of the first RAT.

Various embodiments may preferably implement the following feature:

Preferably, the first RAT is one of new radio RAT and long-term evolution RAT and the second RAT is another one of the new radio RAT and the long-term evolution RAT.

The present disclosure relates to a network device. The network device comprises:

a communication unit configured to receive, from a base station, periodically broadcast system information comprising sidelink indication information and sidelink transmission resource configuration information.

Various embodiments may preferably implement the following feature:

Preferably, the network device further comprises a processor being configured to perform any of aforementioned method steps.

The present disclosure relates to a network node. The network node comprises:

a communication unit configured to periodically broadcast system information comprising sidelink indication information, and to transmit, to a user equipment, sidelink transmission resource configuration information.

Various embodiments may preferably implement the following feature:

Preferably, the network node further comprises a processor being configured to perform any of aforementioned method steps.

The present disclosure relates to a network device. The network device comprises:

a communication unit configured to transmit, to a base station, an indication for indicating a determination of performing sidelink communications.

Various embodiments may preferably implement the following feature:

Preferably, the network device further comprises a processor being configured to perform any of aforementioned method steps.

The present disclosure relates to a network node. The network node comprises:

a communication unit configured to periodically broadcast system information comprising sidelink indication information, and to transmit, to a user equipment, sidelink transmission resource configuration information.

Various embodiments may preferably implement the following feature:

Preferably, the network node further comprises a processor being configured to perform any of aforementioned method steps.

The present disclosure relates to a network device. The network device comprises:

a communication unit configured to receive, from a base station, exceptional resource pool information of a plurality of exceptional resource pools configured for a plurality of cast types.

Various embodiments may preferably implement the following feature:

Preferably, the network device further comprises a processor being configured to perform any of aforementioned method steps.

The present disclosure relates to a network node. The network node comprises:

a communication unit configured to transmit, to a user equipment, exceptional resource pool information of a plurality of exceptional resource pools configured for a plurality of cast types.

Various embodiments may preferably implement the following feature:

Preferably, the network node further comprises a processor being configured to perform any of aforementioned method steps.

The present disclosure relates to a network device. The network device comprises:

a communication unit configured to receive, from a base station, exceptional resource pool information of a plurality of exceptional resource pools, wherein at least one of the plurality of exceptional resource pools is configured without feedback resources and/or at least one of the plurality of exceptional resource pools is configured with the feedback resources.

The present disclosure relates to a network node. The network node comprises:

a communication unit configured to transmit, to a user equipment, exceptional resource pool information of a plurality of exceptional resource pools, wherein at least one of the plurality of exceptional resource pools is configured without feedback resources and/or at least one of the plurality of exceptional resource pools is configured with the feedback resources.

The present disclosure relates to a network device. The network device comprises:

a processor, configured to perform sidelink transmissions based on a sidelink configured grant when determining a physical layer failure.

Various embodiments may preferably implement the following feature:

Preferably, the processor is further configured to perform any of aforementioned method steps.

The present disclosure relates to a network device. The network device comprises:

a communication unit, configured to receive a handover command including the configured grant type 1, and a processor, configured to utilizing at least one of a configured grant type 1 or an exceptional resource pool to perform sidelink transmissions.

Various embodiments may preferably implement the following feature:

Preferably, the processor is further configured to perform any of aforementioned method steps.

The present disclosure relates to a network device operating in a dual-connectivity mode with a master node and a secondary node. The network device comprises:

a communication unit configured to receive, from the master node, sidelink transmission resource configuration information for a plurality of radio access technologies, RATs.

Various embodiments may preferably implement the following feature:

Preferably, the network device further comprises a processor being configured to perform any of aforementioned method steps.

The present disclosure relates to a network node. The network node comprises:

a communication unit configured to transmit, to a user equipment, sidelink transmission resource configuration information for a plurality of radio access technologies, RATs.

Various embodiments may preferably implement the following feature:

Preferably, the network node further comprises a processor being configured to perform any of aforementioned method steps.

The present disclosure relates to a network device connected to a first network node of a first radio access technology, RAT, controlled by a second network node of a second RAT. The network device comprises:

a communication unit configured to receive, from a base station, from the first network node, a sidelink transmission resource configuration of the second RAT with an exceptional resource pool of the first RAT.

Various embodiments may preferably implement the following feature:

Preferably, the network device further comprises a processor being configured to perform any of aforementioned method steps.

The present disclosure relates to a network node which operates in a first radio access technology, RAT, and is controlled by a network node of a second RAT. The network node comprises:

a communication unit configured to transmit, to a user equipment, a sidelink transmission resource configuration of the second RAT with an exceptional resource pool of the first RAT.

Various embodiments may preferably implement the following feature:

Preferably, the network node further comprises a processor being configured to perform any of aforementioned method steps.

The above and other aspects and their implementations are described in greater detail in the drawings, the descriptions, and the claims.

DETAILED DESCRIPTION

Various exemplary embodiments of the present disclosure are described below with reference to the accompanying figures to enable a skilled person to make and use the present disclosure. As would be apparent to those of ordinary skill in the art, after reading the present disclosure, various changes or modifications to the examples described herein can be made without departing from the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
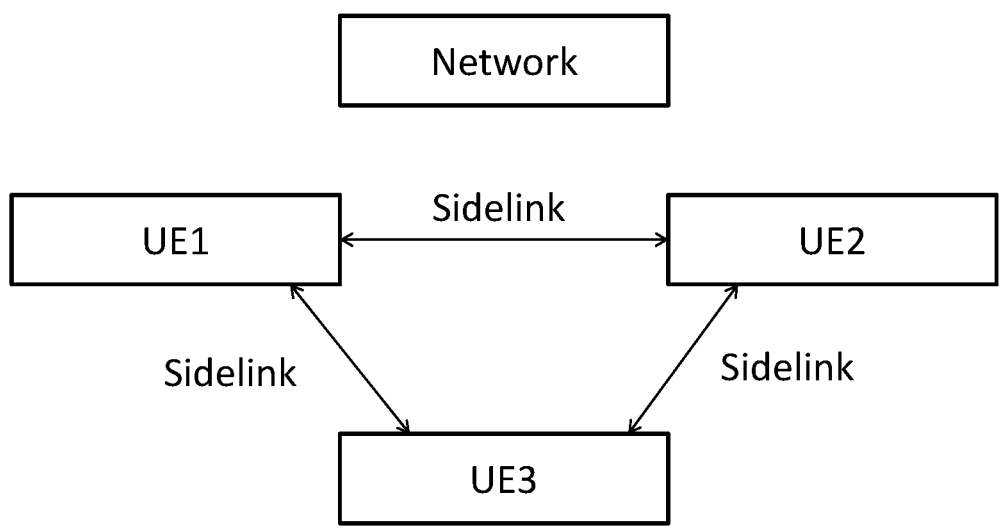
FIG. 1 shows an example of sidelink communications.
Figure 2:
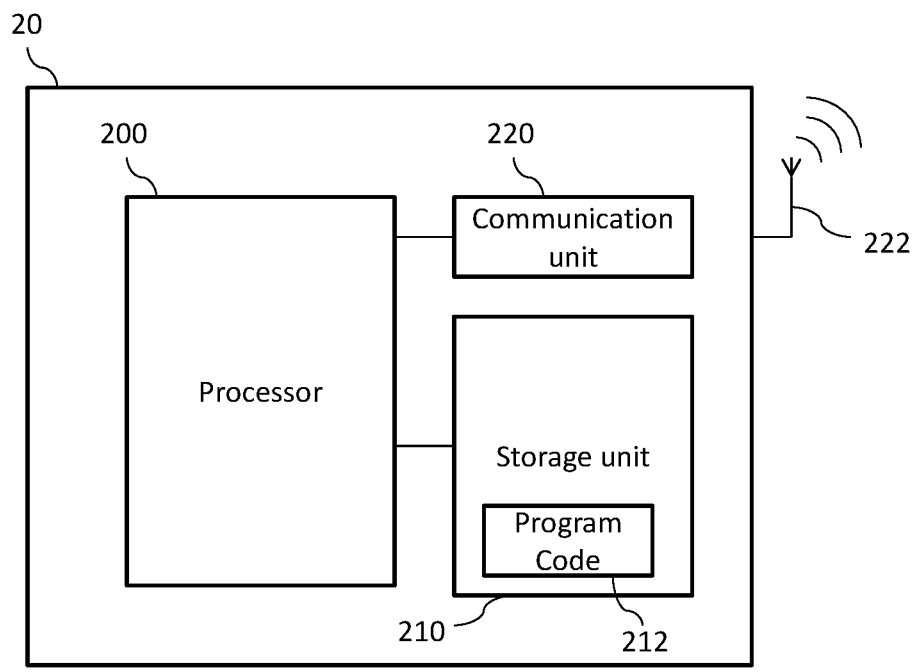
FIG. 2 shows an example of a schematic diagram of a network device according to an embodiment of the present disclosure.

FIG. 2 relates to a schematic diagram of a network device 20 according to an embodiment of the present disclosure. The network device 20 may be a user equipment (UE), a mobile phone, a laptop, a tablet computer, an electronic book or a portable computer system and is not limited herein. The network device 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via an antenna 222 shown in FIG. 2.

In an embodiment, the storage unit 210 and the program code 212 may be omitted and the processor 200 may include a storage unit with stored program code.

The processor 200 may implement any one of the steps in aforementioned embodiments on the network device 20.

The communication unit 220 may be a transceiver. The communication unit 220 may as an alternative or in addition be combining a transmitting unit and a receiving unit configured to transmit and to receive, respectively, signals to and from a network node (e.g. a BS).

Figure 3:
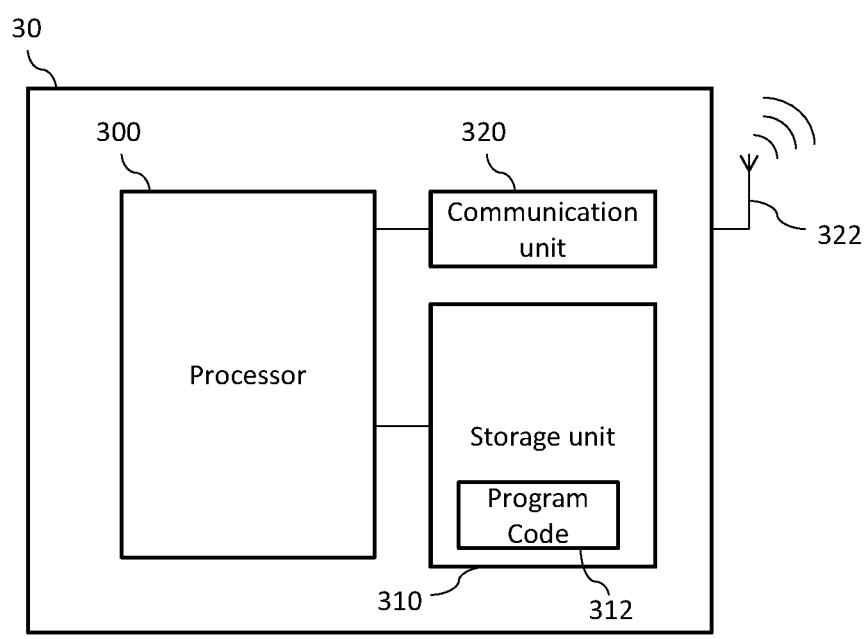
FIG. 3 shows an example of a schematic diagram of a network node according to an embodiment of the present disclosure.

FIG. 3 relates to a schematic diagram of a network node 30 according to an embodiment of the present disclosure. The network node 30 may be a base station (BS), a eNB, a gNB, a network entity, a Mobility Management Entity (MME), Serving Gateway (S-GW), Packet Data Network (PDN) Gateway (P-GW), or Radio Network Controller (RNC), and is not limited herein. The network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via an antenna 322 shown in FIG. 3.

In an embodiment, the storage unit 310 and the program code 312 may be omitted. The processor 300 may include a storage unit with stored program code.

The processor 300 may implement any steps described in aforementioned embodiments on the network node 30.

The communication unit 320 may be a transceiver. The communication unit 320 may as an alternative or in addition be combining a transmitting unit and a receiving unit configured to transmit and to receive, respectively, signals to and from a network device (e.g. a UE).

System Information (SI) consists of a Master-Information-Block (MIB) and a number of system-information-blocks (SIBs). Generally speaking, the MIB is periodically broadcasted on broadcast channel (BCH). Based on information provided in the SIBs, the SIBs may include system information block type 1 (SIB1) to system information block type 9 (SIB9) messages. All types of the SIBs could be periodically broadcasted on downlink shared channel (DL-SCH) or sent in dedicated manner to user equipments (UEs) whose radio resource control (RRC) states are RRC_CONNECTED state (i.e. the UE attached to or building a connection with a network) (RRC_CONNECTED UE hereinafter). In addition, the SIB including the SIB2 to SIB9 messages are carried in SI messages and could be broadcasted upon the network receives requests from the UEs operating in an RRC state RRC_IDLE or RRC_INACTIVE (RRC_IDLE UE or RRC_INACTIVE UE hereinafter). That is, the network can avoid periodically broadcasting the SIB including the SIB2 to SIB9 messages in cells where no UE is camping. As a result, an energy performance of the network is improved.

Specifically, the UE may adopt different methods for acquiring the SI when operating in different RRC states. The RRC_IDLE UE or the RRC_INACTIVE UE may monitor for a SI change indication of SI modifications in its own paging occasion every discontinuous reception (DRX) cycle. The RRC_IDLE UE or the RRC_INACTIVE UE may receive an indication about SI modifications from short messages transmitted with a paging radio network temporary identity (P-RNTI) over downlink control information (DCI). Next, the RRC_IDLE UE or RRC_INACTIVE UE may receive the broadcast SIB1 message and SI messages on the determined physical downlink control channel (PDCCH) monitoring occasions.

In addition, the SIB1 message contains the indication of whether one or more SIBs are only provided on-demand (i.e. provided to a UE when the UE requests). In that case, the UE may initiate a random access procedure using physical random access channel (PRACH) preambles and PRACH resources in a configuration (e.g. si-RequestConfig) corresponding to the SI message(s) for indicating that the UE requires to operate within the cell and then wait to receive the corresponded SI message. If there is not SI specific PRACH resources configured to the UE, the UE may initiate a random access procedure, transmit a request message (e.g. RRCSystemInfoRequest message) and wait to receive the SI message on PDCCH monitoring occasions utilized for SI message reception.

The RRC_CONNECTED UE may monitor for the SI change indication in any paging occasion at least once per modification period when the UE is provided with common search space on an active bandwidth part (BWP) to monitor paging. When the UE has the active BWP with the common search space configured by configurations in the SIB1 message (e.g. searchSpaceSIB1 and pagingSearchSpace)

and receives an indication about changes of SI, the UE may acquire broadcast SIB1 message. When the UE has the active BWP with the common search space configured by a configuration searchSpaceOtherSystemInformation in the SIB1 message, the UE may also acquire the broadcast SI after receiving an indication about changes of the SI. The UE is required to acquire the broadcast SIB1 message and the broadcast SI messages only when the UE is able to acquire the broadcast SIB1 message and the broadcast SI messages without disrupting unicast data reception, i.e. when beams of the broadcast and the unicast are quasi co-located.

In addition, when the UE has an active BWP without common search space configured to monitor system information or paging, the network may provide the SI through dedicated signaling by using configuration messages (e.g. RRCReconfiguration messages). The dedicated signaling may include the SIB1, SIB6, SIB7 and SIB8 messages of a primary cell (PCell). Moreover, the network may provide required SI of PScell and secondary cells (SCells) by the dedicated signaling.

When it comes to NR SL, the RRC_CONNECTED UE may have the active BWP with the common search space configured by configurations in the SIB1 message (e.g. searchSpaceOtherSystemInformation and paging-SearchSpace) and may acquire the broadcasted sidelink SI after receiving an indication about the changes of SI. On the other hand, when the UE has the active BWP without common search space, the gNB may provide the system info via the dedicated signaling.

Figure 4:
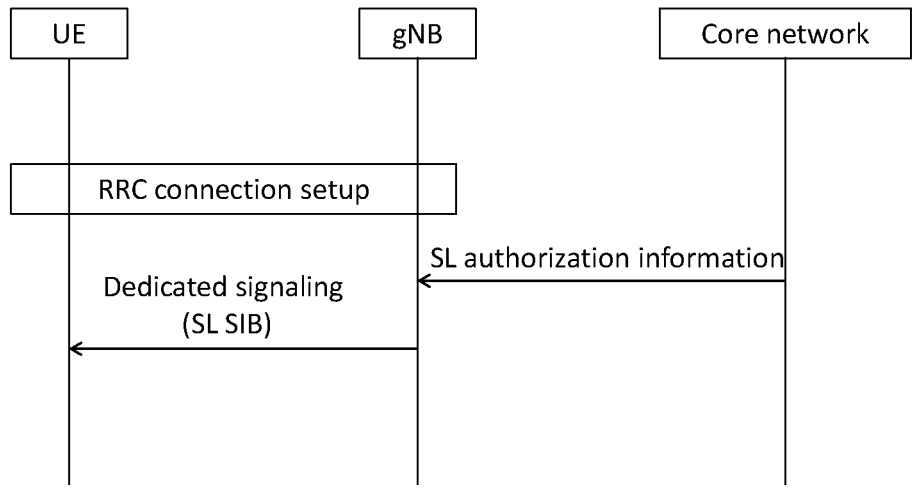
FIG. 4 shows an example of sidelink system information transmission according to an embodiment of the present disclosure.

Specifically, the SI provision by the gNB might be triggered in the following cases for the RRC_CONNECTED UE capable of performing SL communications:

Upon receiving the SL UE authorization information:

SL service authorization information will be conveyed by core network (i.e. 5G core network (5GC)) to the NG-RAN node over NG interface and provided by Xn interfaces between the NG-RAN nodes during mobility events. The SL authorization information may be provided in an initial context setup request message. The gNB could be aware of the UE status immediately after the UE connected to this gNB. Based on the SL authorization information, the gNB may provide the SL SIB to the UE via the dedicated signaling (e.g. RRCReconfiguration message), as shown in FIG. 4. In addition, during mobility events, the target gNB of a handover (HO) procedure may provide the SL SIB of a target cell to the UE during a HO preparation procedure.

Upon receiving the SL capability info:

During the initial UE context setup procedure, the core network may also provide the UE radio capability information to the gNB, which may include the SL capability. In addition, the gNB may initiate the UE capability transfer procedure to the RRC_CONNECTED UE and acquire the UE radio capability information. Based on the corresponding SL capability information, the gNB may determine the SL capability of the UE and then provide the SL SIB via the dedicated signalling to the UE. During mobility events, the target gNB of a HO procedure may obtain the SL capability of the UE together with other radio capability information during a HO preparation procedure. Correspondingly, the target gNB may provide the SL SIB of a target cell to the UE during the HO preparation procedure.

Noted that, even if the UE is capable of and authorized for the SL communications, it does not mean the UE has interest to perform the SL communications. Thus, providing the SL SIB to all of the UEs via dedicated signaling may not be necessary and may result in signal overhead.

Figure 5:
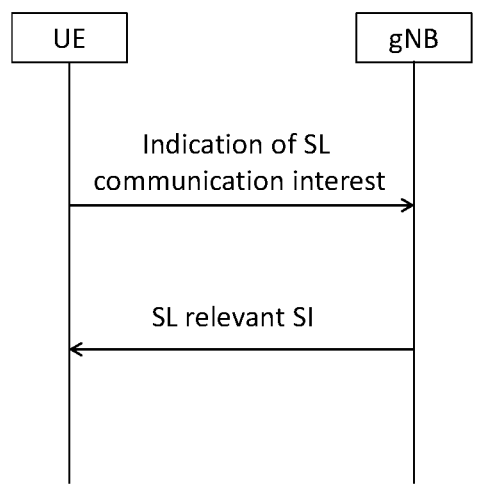
FIG. 5 shows an example of a procedure according to an embodiment of the present disclosure.

FIG. 5 shows an example of a procedure according to an embodiment of the present disclosure. In this embodiment, the UE (e.g. RRC_CONNECTED UE) transmits an indication for indicating an SL communication interest of the UE (e.g. whether the UE is interested in performing the SL communications or whether the UE determines to perform the SL communications) to the base station (e.g. gNB), in order to reduce the signal overhead. Base on the indication, the base station may transmit SL relevant SI (e.g. SL SIBs) to the UE when determining that UE is interested in performing the SL communications or that the UE determines performing the SL communications.

In an embodiment, the indication for indicating the SL communication interest is included in a message which is transmitted from the UE to the BS when the UE determines the SL SIB is available and is interested in performing the SL communications (or determines performing the SL communications). For example, the message including the indication for indicating the SL communication interest may be the SidelinkUEInformation message.

In an embodiment, the SL communications are SL transmissions and/or SL receptions. That is, the SL relevant SL may be information of SL transmission configurations and/or SL reception configurations.

In an embodiment, an RRCSystemInforequest message may be reused to reduce the signal overhead caused by broadcasting the SL SIB. The RRCSystemInforequest message is used by the RRC_IDLE UE or RRC_INACTIVE UE to request SI messages. It is transmitted over signaling radio bearer (SRB) SRB0 on the common control channel (CCCH) and a transparent mode (TM) is used for radio link control (RLC). Therefore, the RRCSystemInforequest message is hard to be directly reused by the RRC_CONNECTED UE. In order for the RRC_CONNECTED UE to transmit the SL SIB request, a new RRC message should be designed for the RRC_CONNECTED UE to request the SL SI and the newly designed message may contain the system info request indication, or specific SIB info request indication.

In an aspect, the RRC_IDLE UE or RRC_INACTIVE UE may obtain the SL SI (e.g. the SL SIB) directly through on-demand request or via broadcast as normal way. The on-demand SL SI (the SL SI acquired through the on-demand request) includes SL reception resource pool configuration and the RRC_IDLE UE or the RRC_INACTIVE UE may accordingly perform the SL receptions. However, if the on-demand SL SI doe not include SL transmission (Tx) resource pool configuration, then the RRC_IDLE UE or the RRC_INACTIVE UE has to enter the RRC_CONNECTED state to request the SL Tx resource pool. Under such a condition, the UE may need to perform a random access procedure twice when the SL Tx resource pool is not included in the on-demand SL SI. For example, the RRC_IDLE UE or the RRC_INACTIVE UE may perform a random access procedure for receiving the on-demand SL SI without the SL Tx resource pool and perform another random access procedure to request the SL Tx resource pool.

In order to avoid performing additional random access procedure, the base station (e.g. gNB) may include an SL indication information in periodically broadcast SI (e.g. SIB1 message). In an embodiment, the SL indication information is configured to indicate that whether the RRC_IDLE UE or the RRC_INACTIVE UE is allowed to perform the SL transmissions. When the RRC_IDLE UE or the RRC_INACTIVE UE determines that being allowed to perform the SL transmissions and that the SL Tx resource pool for the RRC_IDLE UE or the RRC_INACTIVE UE is not included in the broadcast SI, the RRC_IDLE UE or the RRC_INACTIVE UE may enter the RRC_CONNECTED state and request for the SL Tx resource pool (via dedicated signaling). Otherwise, the RRC_IDLE UE or the RRC_INACTIVE UE may perform the random access procedure to request the on-demand SL SI and then perform the SL transmission and reception at the RRC_INACTIVE or RRC_IDLE state.

In an embodiment, the SL indication information may include at least one of an indication of whether the SL transmissions are enabled for the RRC_IDLE UE or RRC_INACTIVE UE, an indication of whether an SL Tx resource pool is provided in the on-demand SI, an indication of whether an SL radio bearer configuration is provided in the on-demand SI, an SL Tx resource pool or an SL exceptional transmission resource pool.

Figure 6:
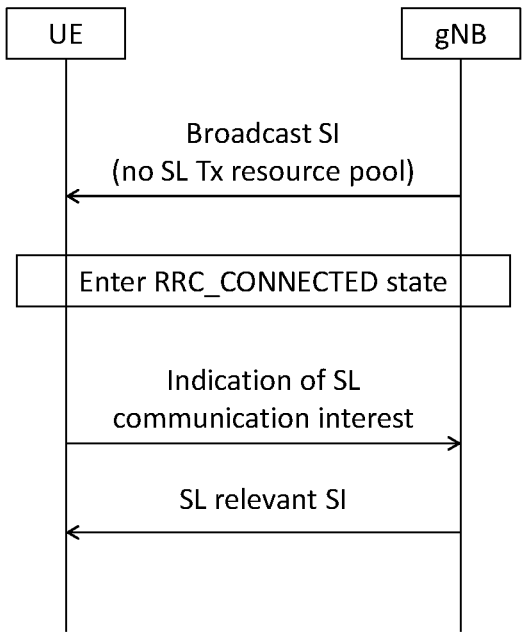
FIG. 6 shows an example of a procedure according to an embodiment of the present disclosure.

FIG. 6 shows an embodiment of the periodically broadcast SI including the SL indication information. In FIG. 6, the gNB periodically broadcasts the SI which does not have SL Tx resource pool and includes the SL indication information to the RRC_IDLE UE or RRC_INACTIVE UE. In this embodiment, the RRC_IDLE UE or RRC_INACTIVE UE determines the SL transmissions are allowed based on the SL indication information and there is not Tx resource pool in the broadcast SI. Next, the RRC_IDLE UE or RRC_INACTIVE UE enters the RRC_CONNECTED state by performing an RRC procedure (e.g. RRC connection setup). After entering the RRC_CONNECTED state, the UE transmits an indication of SL communication interest to indicate that the UE is interested in performing the SL transmissions and receives the SL relevant SI. Accordingly, the UE is able to perform the SL transmissions.

In an embodiment, the UE detects a radio link failure and may initiate an RRC connection re-establishment procedure. Under such a condition, the UE may require some time to select a suitable cell for re-establishing an RRC connection. During the period of selecting the suitable cell, an exceptional resource pool may be used in order to improve service continuity. The exceptional resource pool could be provided via SL SIB or dedicated signaling. Only random resource selection is allowed in the exceptional resource pool.

Figure 7:
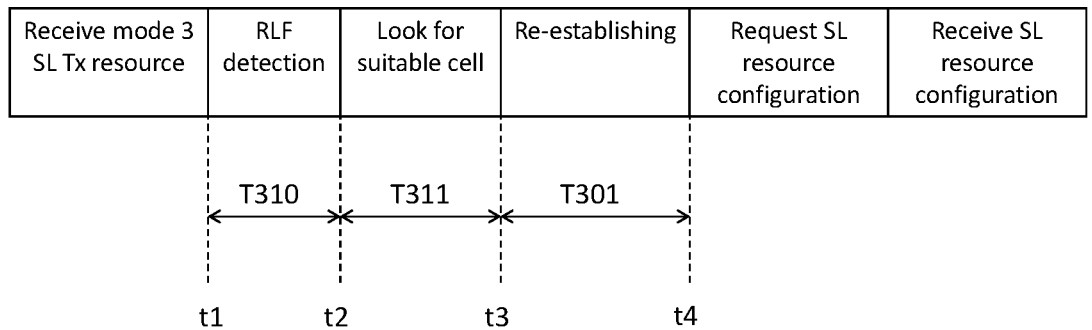
FIG. 7 shows an example of utilizing the exceptional resource poll according to an embodiment of the present disclosure.

FIG. 7 shows an example of the RRC_CONNECTED UE utilizing the exceptional resource poll according to an embodiment of the present disclosure. In long-term evolution (LTE), the RRC_CONNECTED UE configured with mode 3 resource allocation may utilize the exceptional resource pool at some specific times shown in FIG. 7. For example, when a timer T310 for radio link failure (RLF) detection or a timer T311 for selecting a suitable cell is running, the UE may utilize the exceptional resource pool provided by the PCell when detecting a physical layer failure (e.g. a physical layer problem or an RLF). Note that, the timer T310 is started upon detecting the physical layer problem, i.e. receiving a certain number (e.g. the number N310) of consecutive out of sync indications and is stopped upon receiving a certain number (e.g. the number N311) of consecutive in-sync indication, triggering a HO or initiating an RRC reestablishment procedure. The timer T311 is started upon initiating the RRC reestablishment and is stopped after the suitable cell is selected.

Furthermore, when a timer T301 for re-establishing the RRC connection is running, the UE may utilize the exceptional resource pool of the cell on which UE initiate re-establishment. The timer T301 is started when the UE transmits an RRC-reestablishment request and is stopped when the RRC connection is successfully re-established (i.e. the RRC connection re-establishment successes).

Moreover, the RRC_CONNECTED UE configured with a mode 4 resource allocation may utilize the exceptional resource pool configured via broadcast, dedicated signaling or a HO command when the sensing result of the mode 4 Tx resource pool is not available.

In addition, the RRC_CONNECTED UE performing a HO procedure may utilize the exceptional resource pool provided by the HO command of the HO procedure when a timer T304 for the HO procedure is running. The timer T304 is started upon the UE receives the HO command and is stopped when the HO procedure successes. More specifically, the exceptional resource pool delivered via the HO command could be used when UE completes synchronization with a target cell or (GPS and/or GLONASS) GNSS. For the mode 3 resource allocation from target cell, the exceptional resource pool could be used until the timer T304 is stopped. For the mode 4 resource allocation from the target cell, the exceptional resource pool could be used until the sensing result of the mode 4 Tx resource pool is available.

In the NR, the SL transmission needs to support three cast types: broadcast, groupcast and unicast. In an embodiment, not only SL transmission resource pools but also exceptional resources polls are required to be associated with different cast types. For example, the UE may receive exceptional resource pool information of a plurality of exception resource pools associated to (e.g. configured for) a plurality of cast types (e.g. the broadcast, the groupcast and the unicast). When determining utilizing the exceptional resource pool for performing SL transmissions, the UE may select one of the plurality of the exception resource pools based on the cast type.

In an embodiment, the SL transmission resource pool may be configured with or without feedback resources (e.g. physical SL feedback channel (PSFCH)) irrespective of the cast type. For the group cast and the unicast, an SL hybrid automatic repeat request (HARQ) feedback may be enabled or disabled. In other words, for the SL unicast/groupcast traffic, UE may use the sidelink transmission resource pool without PSFCH resource when the SL HARQ feedback is disabled. Thus, the plurality of exceptional resource pools configured to the UE may include at least one exceptional resource pool without the PSFCH and at least one exceptional resource pool with the PSFCH.

In an embodiment, the UE may receive exceptional resource pool information of a plurality of exceptional resource pools configured for a plurality of cast types, or with or without feedback resources (e.g. the PSFCH).

In an embodiment, the UE may utilize the exceptional resource pool when the SI changes. In the NR, SIB validity mechanism may enable validity area for SL resource pool configured via broadcasted system information. Under such a condition, when the UE re-selects a cell with the same validity areaScope and SL SIB valueTag, the UE does not need to acquire the SL SIB from the re-selected cell and is able to use the sidelink transmission resource pool received from the previously camped cell. If the UE re-selects a cell with cell-specific SL SIB or a cell with different validity areaScope and/or different SL SIB valueTag, the RRC_IDLE/INACTIVE UE may use the randomly selected resources from the exceptional transmission resource pool of the re-selected cell until the sensing results on the transmission resource pools for autonomous resource selection are available.

In the NR, the SL SI may be provided on-demand for the RRC_IDLE UE or the RRC_INACTIVE UE. That is, the on-demand SL SI is provided to the RRC_IDLE UE or the RRC_INACTIVE UE when the RRC_IDLE UE or the RRC_INACTIVE UE requests for the SL SI. When the UE needs to use the exceptional transmission resource pool of the re-selected cell and the exceptional resource pool is included in the SL SI, the UE has to first request the SL SI via a random access procedure and then wait to receive the broadcast SL SI message. Before UE receive the SL relevant SI of the re-selected cell in the broadcast SL SI message, the UE has no available SL resource pool and the SL transmission has to be interrupted. To avoid this interruption, the base station (e.g. gNb) may always broadcast the exceptional resource pool periodically in an embodiment. In this case, the UE may acquire the exceptional resource pool of neighboring cells in advance and use the exceptional resource pool of the re-selected cell immediately after the re-selection.

In an embodiment, the UE may utilize the exceptional resource pool to perform the SL transmissions when the RRC state of the UE transits from the idle state or the inactive state to the connected state. When the RRC state of the UE changes from the idle state or the inactive state to the connected state, the UE may not be configured to use mode 1 or mode 2 resource allocation. Thus, the UE could only use the exceptional resource pool. In other words, the UE may utilize the exceptional resource pool from the moment the UE initiates connection establishment until receiving an RRC configuration (e.g. RRCReconfiguration) including the SL transmission resource configurations or until receiving an RRCConnectionRelease or an RCConnectionReject.

In an embodiment, the UE may utilize the exceptional resource pool when detecting (e.g. determining) a physical layer failure (e.g. a physical layer problem or RLF). In this embodiment, the operations of the UE may change with an SL resource allocation of the UE, wherein the SL resource allocation may be one of a dynamic resource allocation, a grant free allocation (i.e. configured grant type 1) and a semi-persistent scheduling allocation (i.e. configured grant type 2).

In an embodiment of the SL resource allocation of the UE is the dynamic resource allocation, the UE may only use the exceptional resource pool when determining the physical layer problems or RLF.

In an embodiment of the SL resource allocation of the UE is the configured grant type 1 (i.e. an SL configured grant of the UE is the configured grant type 1), the UE may use the exceptional resource pool for all SL traffic transmissions when detecting the physical layer problem or RLF. Or, the UE may continue to use the configured grant type 1 to transmit the SL packet on logic channels being allowed to use the configured grant type 1 when detecting (e.g. determining) the physical layer problem or RLF. On the logic channels not being allowed to use the configured grant type 1, the UE may only utilize the exceptional resource pool for transmitting the SL packet. In another embodiment, the UE may disregard the configured grant type 1 SL logical channel prioritization (LCP) mapping restrictions and use the configured grant type 1 for all of the SL traffic transmissions when detecting the physical layer problem or RLF.

In an embodiment of the SL resource allocation of the UE is the configured grant type 2 (i.e. an SL configured grant of the UE is the configured grant type 2), the UE may use the configured grant type 2 to transit any SL traffic when detecting the physical layer problem or RLF because there is not SL LCP mapping restriction is associated with the configured grant type 2. When initiating an RRC re-establishment procedure, the UE may change to use the exceptional resource pool of re-established cell. After the UE re-establishes the RRC connection with the re-established cell, the UE may continue using the exceptional resource pool until receiving an RRC configuration (e.g. RRCReconfiguration) including the SL resource configuration.

In an embodiment, the UE may perform the SL transmissions based on the SL configured grant when determining the physical layer failure (e.g. physical layer problem or RLF), wherein the SL configured grant may be one of the configured grant type 1 or the configured grant type 2. When the SL configured grant is the configured grant type 1 and the UE determines the physical layer problem or RLF, the UE may utilize the configured grant type 1 to perform the SL transmissions on the logic channel being allowed to use the configured grant type 1, and/or the UE may utilize the exception resource pool to perform the SL transmissions on the logic channel not being allowed to use the configured grant type 1. In an embodiment of the SL configured grant is the configured grant type 1, the UE may utilize the configured grant type 1 for the SL transmissions on all of the logic channels.

When the SL configured grant is the configured grant type 2, the UE may utilize the configured grant type 2 to perform the SL transmissions when determining the physical layer problem or RLF. The UE may further initiate the RRC re-establishment procedure and utilize the exceptional resource pool of the re-established cell to perform the SL transmissions. Moreover, the UE may continue using the exceptional resource pool of the re-established cell to perform the SL transmissions before receiving the SL resource configuration from the re-established cell after the RRC re-establishment is successful.

In an embodiment, the UE may use the exceptional resource pool when receiving a HO command, e.g., for performing a HO procedure. In details, the SL transmission resource pool configurations including the exceptional transmission resource pool for a target cell of the HO procedure can be included in the HO command. Under such a condition, the UE may use the exceptional resource pool included in the SL transmission resource pool configurations of the target cell before the handover is completed as long as either synchronization is performed. The UE may continue to use the exceptional resource pool until the sensing result is available or the HO procedure is completed.

In an embodiment of the handover command including the configured grant type 1, the UE may continue to use the configured grant type 1 to transmit the SL packet on logic channels being allowed to use the configured grant type 1 when detecting (e.g. determining) the physical layer problem or RLF. In another embodiment of the handover command including the configured grant type 1, the UE may only utilize the exceptional resource pool for transmitting the SL packet on the logic channels not being allowed to use the configured grant type 1. In still another embodiment, the UE may disregard the configured grant type 1 SL LCP mapping restrictions and use the configured grant type 1 for all of the SL traffic transmissions when detecting the physical layer problem or RLF.

In an embodiment, the exceptional resource pool might be delivered via the SL SIB or dedicated RRC signaling. In another embodiment, the exceptional resource pool may be included in the HO command.

In an embodiment of the UE operating in a dual connectivity (DC) mode, the UE may receive SL transmission resource configuration information for a plurality of radio access technologies (RATs) from a master node. For example, the UE may operate in a multi-RAT DC (MR-DC) mode, wherein the master node may be configured for LTE and a secondary node may be configured for NR. Under such a condition, the master node may configure the SL transmission resource configuration information of both LTE and NR to the UE. When a new secondary cell (SCell) or a new SCell group of the master node is configured, the MN may transmit the SL transmission resource configuration information as well as an exceptional resource pool of at least one secondary cell of the master node to the UE.

In an embodiment of the UE operating in a cross-RAT scenario, the base station may provide the SL transmission resource configuration of a currently used RAT with an exceptional resource pool of another supported RAT. For example, the UE may connect to a first network node of a first RAT (e.g. NR) which is controlled by a second network node of a second RAT (e.g. LTE). Under such a condition, the first network node may transmit the SL resource configuration of the second RAT with the exceptional resource pool of the first RAT to the UE.

What is claimed is:

1. A wireless communication method for use in a user equipment, the wireless communication method comprising:
   receiving, from a base station, periodically broadcast system information comprising sidelink indication information;
   receiving, from the base station, sidelink transmission resource configuration information; and
   establishing a connection with the base station and receiving, from the base station, the sidelink transmission resource configuration information when determining the periodically broadcast system information does not have sidelink transmission resource configuration information,
   wherein the sidelink indication information comprises at least one of an indication of whether sidelink transmissions are enabled for RRC_IDLE/INACTIVE_UE, an indication of whether a sidelink transmission resource pool is provided in on-demand system information, an indication of whether sidelink radio bearer configuration is provided in the on-demand system information, a sidelink transmission resource pool or a sidelink exceptional transmission resource pool.

2. The wireless communication method of claim 1, wherein the step of receiving, from the base station, the sidelink resource configuration information comprises:
   transmitting, to the base station, a system information request message, and
   receiving, from the base station, the sidelink transmission resource configuration information from on-demand system information.

3. The wireless communication method of claim 1, further comprising:
   performing sidelink transmissions based on the sidelink transmission resource configuration information.

4. The wireless communication method of claim 1, wherein a radio resource control state of the user equipment is one of an idle state or an inactive state.

5. A wireless communication method for use in a base station, the wireless communication method comprising:
   periodically broadcasting system information comprising sidelink indication information, and
   transmitting, to a user equipment, sidelink transmission resource configuration information; and
   establishing a connection with the user equipment and transmitting, to the user equipment, the sidelink transmission resource configuration information when the periodically broadcast system information does not have sidelink transmission resource configuration information,
   wherein the sidelink indication information comprises at least one of an indication of whether sidelink transmissions are enabled for RRC_IDLE/INACTIVE_UE, an indication of whether a sidelink transmission resource pool is provided in on-demand system information, an indication of whether sidelink radio bearer configuration is provided in on-demand system information, a sidelink transmission resource pool or a sidelink exceptional transmission resource pool.

6. The wireless communication method of claim 5, wherein the step of transmitting, to the user equipment, the sidelink transmission resource configuration information comprises:
   transmitting, to the user equipment, the sidelink transmission resource configuration information in on-demand system information.

7. The wireless communication method of claim 5, wherein a radio resource control state of the user equipment is one of an idle state or an inactive state.

8. A network device comprising:
   a processor configured to receive, via a transceiver from a base station, periodically broadcast system information comprising sidelink indication information and sidelink transmission resource configuration information; and
   establish a connection with the base station and receive, from the base station, the sidelink transmission resource configuration information when determining the periodically broadcast system information does not have sidelink transmission resource configuration information,
   wherein the sidelink indication information comprises at least one of an indication of whether sidelink transmissions are enabled for RRC_IDLE/INACTIVE_UE, an indication of whether a sidelink transmission resource pool is provided in on-demand system information, an indication of whether sidelink radio bearer configuration is provided in the on-demand system information, a sidelink transmission resource pool or a sidelink exceptional transmission resource pool.

9. The network device according to claim 8, wherein the processor is further configured to:
   transmit, via the transceiver to the base station a system information request message, and
   receive, via the transceiver from the base station, the sidelink transmission resource configuration information from on-demand system information.

10. The network device according to claim 8, wherein the processor is further configured to:
    perform sidelink transmissions based on the sidelink transmission resource configuration information.

11. A network node comprising:
    a processor configured to periodically broadcast system information comprising sidelink indication information, and to transmit, via a transceiver to a user equipment, sidelink transmission resource configuration information; and
    establish a connection with the user equipment and transmit, via the transceiver to the user equipment, the sidelink transmission resource configuration information when the periodically broadcast system information does not have sidelink transmission resource configuration information, wherein the sidelink indication information comprises at least one of an indication of whether sidelink transmissions are enabled for RRC_IDLE/INACTIVE_UE, an indication of whether a sidelink transmission resource pool is provided in on-demand system information, an indication of whether sidelink radio bearer configuration is provided in on-demand system information, a sidelink transmission resource pool or a sidelink exceptional transmission resource pool.

12. The network node according to claim 11, wherein the processor is further configured to:
transmit, via the transceiver to the user equipment, the sidelink transmission resource configuration information in on-demand system information.

* * * * *